US011498526B2

(12) United States Patent
Polocoser et al.

(10) Patent No.: US 11,498,526 B2
(45) Date of Patent: Nov. 15, 2022

(54) WIPER BLADE CONNECTOR ASSEMBLY

(71) Applicant: TRICO PRODUCTS CORPORATION, Rochester Hills, MI (US)

(72) Inventors: Mitica Polocoser, Plymouth Township, MI (US); Valentin Avasiloaie, Clinton, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 256 days.

(21) Appl. No.: 16/646,664

(22) PCT Filed: Sep. 13, 2018

(86) PCT No.: PCT/US2018/050857
§ 371 (c)(1),
(2) Date: Mar. 12, 2020

(87) PCT Pub. No.: WO2019/055640
PCT Pub. Date: Mar. 21, 2019

(65) Prior Publication Data
US 2020/0269818 A1    Aug. 27, 2020

Related U.S. Application Data

(60) Provisional application No. 62/558,347, filed on Sep. 13, 2017.

(51) Int. Cl.
*B60S 1/38*    (2006.01)
*B60S 1/40*    (2006.01)

(52) U.S. Cl.
CPC ......... *B60S 1/3851* (2013.01); *B60S 1/3867* (2013.01); *B60S 1/4048* (2013.01); *B60S 2001/4051* (2013.01)

(58) Field of Classification Search
CPC ............ B60S 1/38; B60S 1/40; B60S 1/4048
See application file for complete search history.

(56) References Cited

U.S. PATENT DOCUMENTS

| | | | |
|---|---|---|---|
| 10,442,404 B2 * | 10/2019 | Ku | B60S 1/40 |
| 2011/0247166 A1 * | 10/2011 | Depondt | B60S 1/387 15/250.32 |
| 2011/0277265 A1 * | 11/2011 | Ehde | B60S 1/4038 15/250.32 |
| 2013/0298348 A1 * | 11/2013 | Caillot | B60S 1/3805 15/250.32 |
| 2014/0196240 A1 * | 7/2014 | Grasso | B60S 1/3862 15/250.04 |
| 2016/0375869 A1 * | 12/2016 | Gaucher | B60S 1/40 15/250.32 |

FOREIGN PATENT DOCUMENTS

| | | |
|---|---|---|
| DE | 102013019805 | 5/2015 |
| DE | 102016111650 | 12/2016 |
| DE | 102015225889 | 6/2017 |

* cited by examiner

*Primary Examiner* — Michael D Jennings
(74) *Attorney, Agent, or Firm* — Bryan Cave Leighton Paisner LLP

(57) ABSTRACT

An adapter is provided to attach a non-original wiper blade assembly to a wiper arm of a vehicle which is usable with an existing sliding latch and other aesthetic and functional components of the wiper arm to maintain the original aesthetics of the wiper system while allowing installation of non-original wiper blade assemblies.

18 Claims, 11 Drawing Sheets

WIPER BLADE CONNECTOR ASSEMBLY

CROSS-REFERENCE TO RELATED APPLICATIONS

This application claims priority to U.S. Provisional Application No. 62/558,347, filed on Sep. 13, 2017, the disclosure of which is incorporated herein in its entirety by reference.

BACKGROUND OF THE INVENTION

1. Field of the Invention

The invention relates to an improved wiper blade connector assembly.

2. Description of Related Art

Various wiper connecting arrangements are known such as that system disclosed in U.S. Pat. No. 9,352,725 B2 (Duesterhoeft), the disclosure of which is incorporated herein in its entirety by reference. The components of this prior art system, however, are specifically constructed for use together, wherein the system requires all of the disclosed components to be used with each other component. As such, this prior art system generally would not be used in association with wiper assemblies from other manufacturers.

SUMMARY OF THE INVENTION

It is an object of the invention to provide an improved connector assembly having an improved adaptor that is usable with various manufacturers.

The invention relates to an improved connector assembly and an adaptor therefor which is usable with an existing sliding latch and other aesthetic and functional components of the vehicle to maintain the original aesthetics of the wiper system while allowing installation of non-original wiper blade assemblies.

Other objects and purposes of the invention, and variations thereof, will be apparent upon reading the following specification and inspecting the accompanying drawings.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
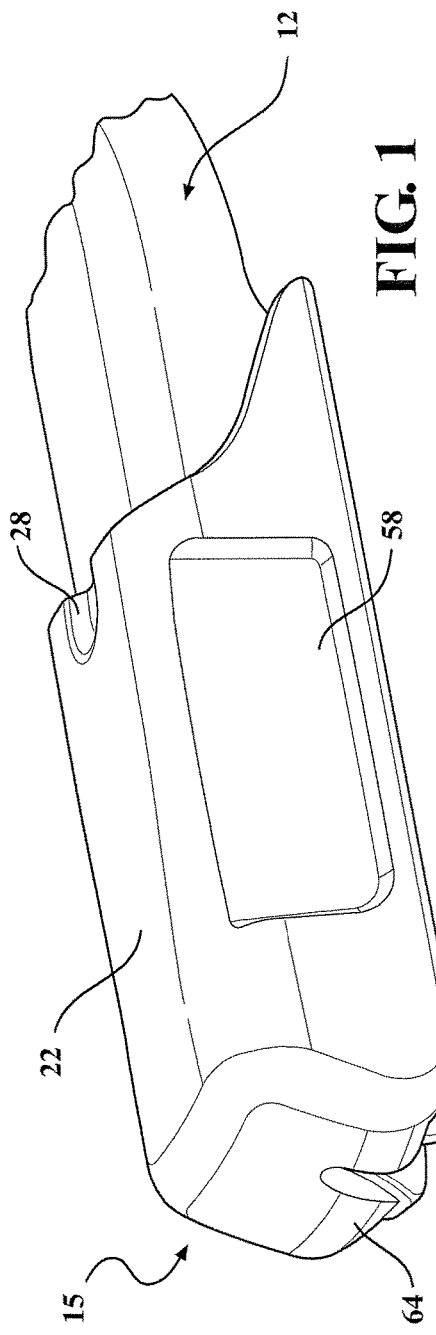
FIG. 1 is a perspective view of a typical wiper arm.
Figure 2:
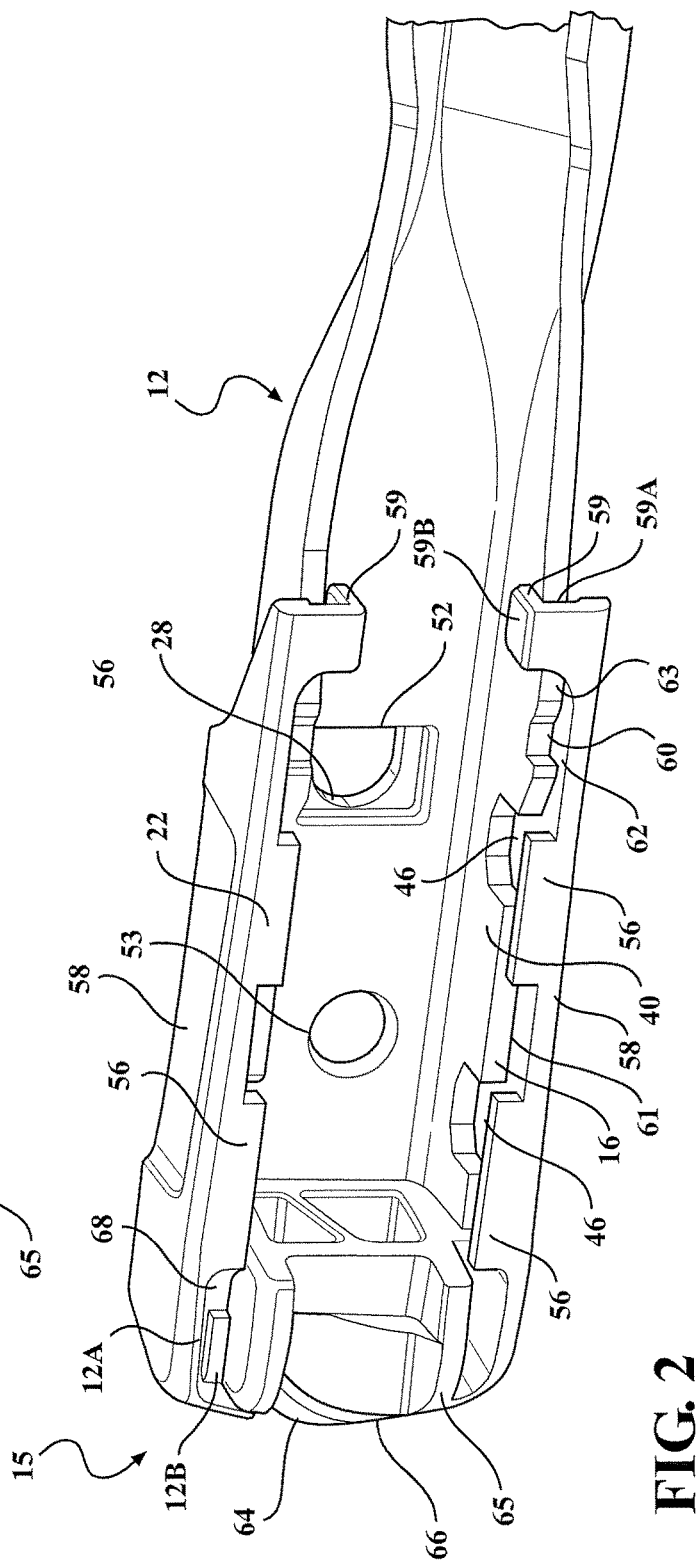
FIG. 2 is an upward perspective view of a bottom portion of the wiper arm shown in FIG. 1.
Figure 3:
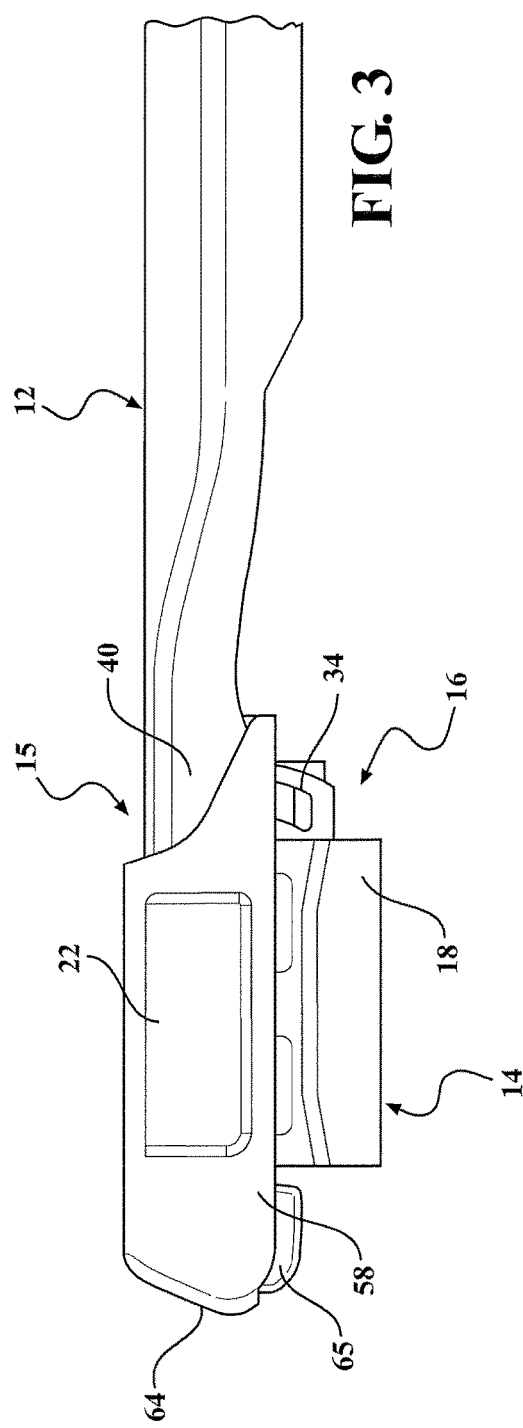
FIG. 3 is a side view of the wiper arm shown in FIG. 1 connected to a related art adaptor and to a wiper blade.
Figure 4:
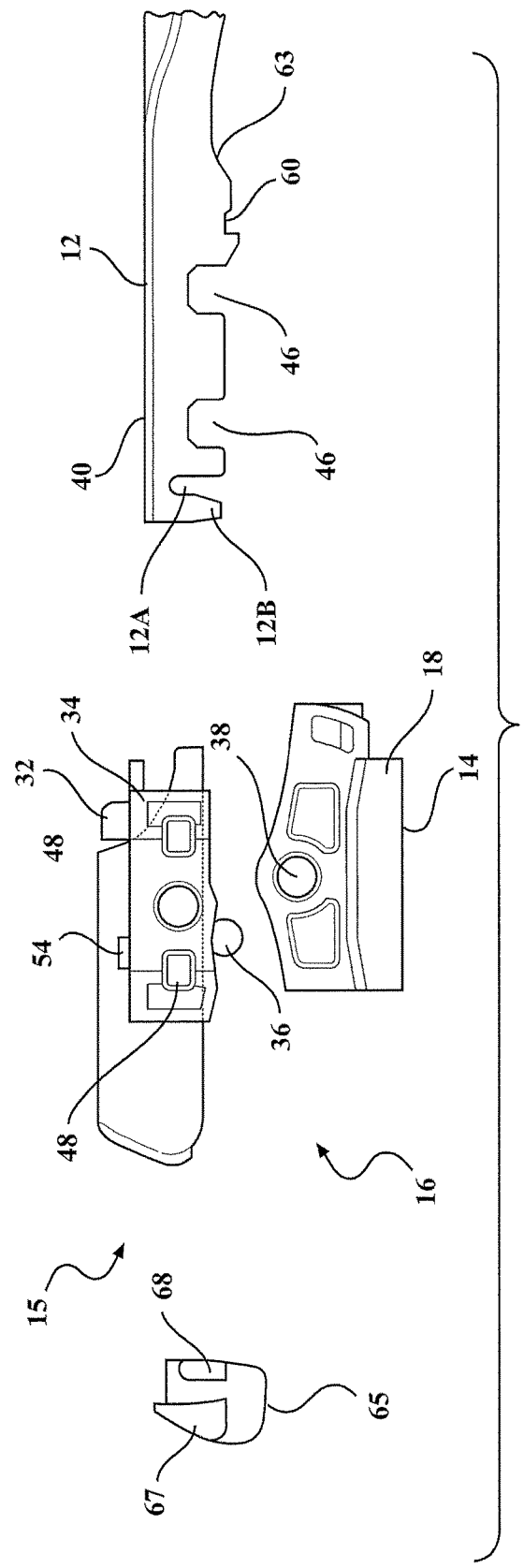
FIG. 4 is an exploded view of portions of the wiper at in shown in FIG. 1 and the related art adaptor components as shown in FIG. 3.

FIGS. 1 and 2 show part of a wiper arm 12, wherein, as further seen in FIGS. 3-8, the wiper arm 12 is connectable to a wiper blade or wiper blade unit 14 of a windshield wiper system 15 of a vehicle. The wiper arm 12 is connectable to the wiper blade 14 by an adaptor 16 that is received in an end region of the wiper arm 12 wherein the figures show only a connector part joined to the wiper arm that is referenced herein as a rider 18. The rider 18 engages around the remaining components of the wiper blade 14 and therefore joins the wiper arm 12 and wiper blade 14 together. The illustrated rider 18 is designed for specific use with the components illustrated in FIGS. 1-8. The wiper blade or wiper blade unit 14 also may comprise a spoiler and a blade rubber (not shown) to form an assembly configured to wipe a windshield or windscreen (also not shown) of the vehicle.

In order to hold the adaptor 16 securely on the wiper arm 12, a sliding latch 22 is arranged on the wiper arm 12, which latch 22 is held thereon such that it can be displaced in a direction extending along the longitudinal extent of the wiper arm 12. In a functional position of the sliding latch 22 shown in FIGS. 1 and 5, the latch 22 ensures that the adaptor 16 (FIG. 4) and with it the wiper blade 14 cannot be removed from the wiper arm 12. In this functional position of the sliding latch 22, a recess 28 provided in the sliding latch 22 and having a semi-circular contour is in abutment with a projection 32 protruding upwards over a base body of a rocker 34 that forms part of the adaptor 16 as best seen in FIGS. 3-6. The rocker 34 is supported on a pin-shaped bearing bolt 36 which is pushed through a passage opening 38 provided in the rider 18 so that the rocker 34 is fixedly secured to the rider 18 to form the adaptor 16.

The wiper blade 14 is attached to an end region 40 of the wiper arm 12 by means of the adaptor 16 holding the wiper blade 14, wherein the adaptor 16 is inserted from below the wiper arm 12 into the end region 40 thereof which is open downwardly. For this purpose, the sliding latch 22 is first displaced into an installation position allowing the adaptor 16 to be fitted to the end region 40 from below, which is likewise a removal position allowing the adaptor 16 and wiper blade 14 to be removed.

Figure 6:
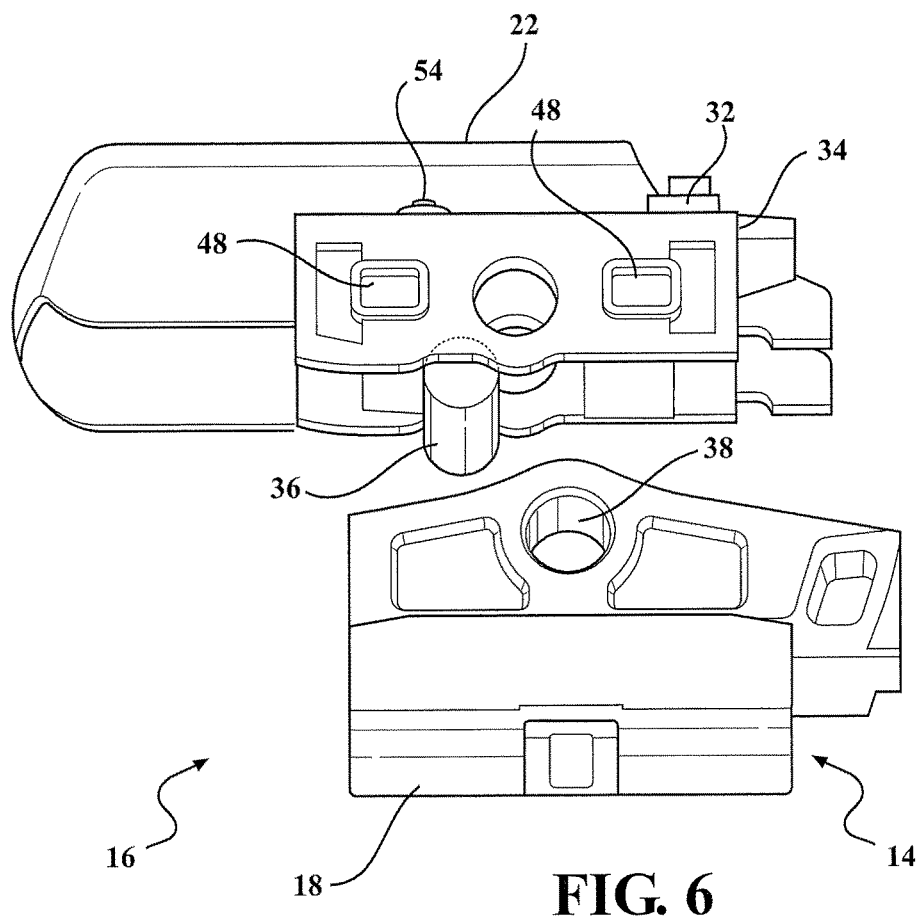
FIG. 6 is an exploded side view of the related art adaptor components as shown in FIG. 4.
Figure 7:
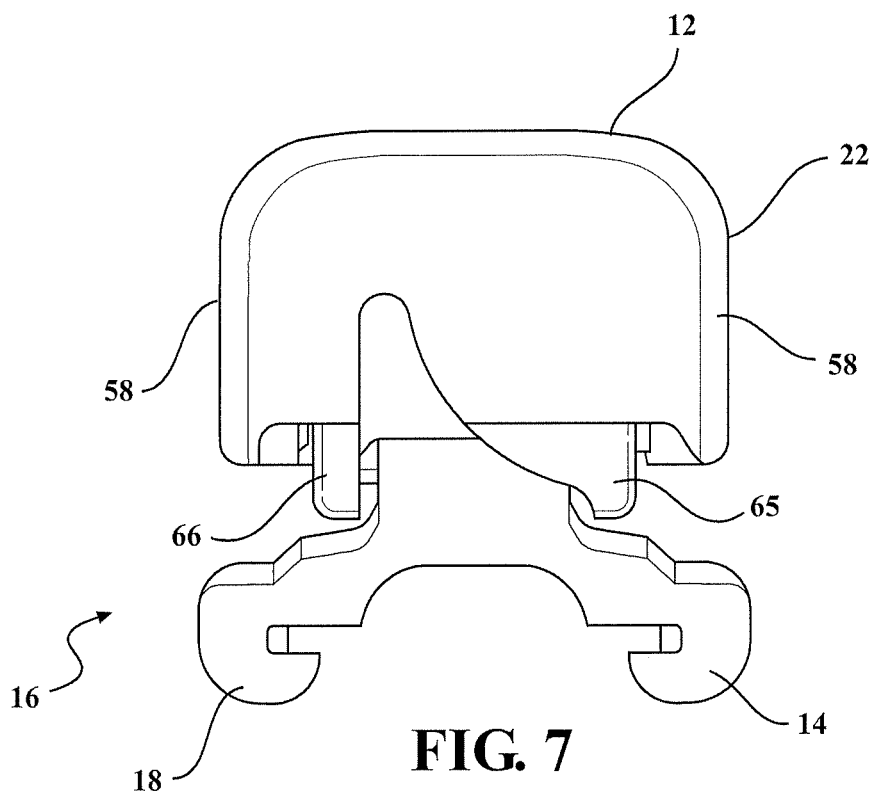
FIG. 7 is an end perspective view of the wiper arm assembled with the related art adaptor as shown in FIG. 3.
Figure 8:
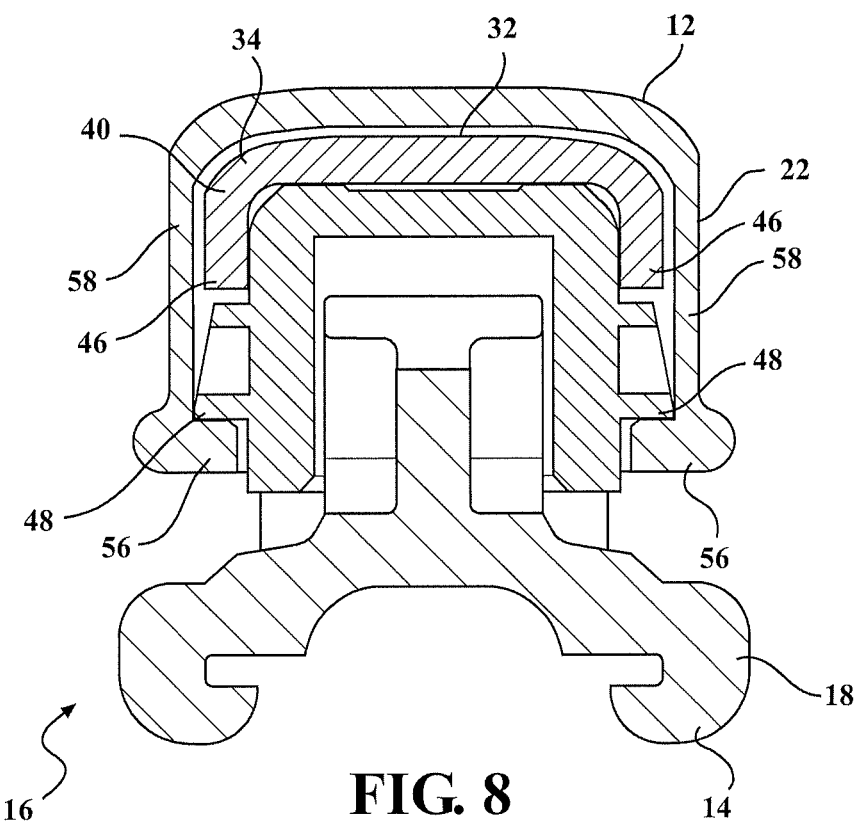
FIG. 8 is a cross-section end view of the wiper arm assembled with the related art adaptor as shown in FIG. 3.

As best seen in FIGS. 2, 6 and 8, the end region 40 of the wiper arm 12 has a U-profile in cross section which has two downwardly open recesses 46 on each side which, if the adaptor 16 is brought into the end region 40, receive two respective bar studs 48 that extend beyond the respective side walls of the rocker 34. If the four bar studs 48 are received in the four recesses 46 corresponding to them in the end region 40 of the wiper arm 12, the adaptor 16 can no longer move in the direction of the longitudinal extent of the wiper arm 12. The upward projection 32 on the rocker 34 then also passes through a through-opening 52 in the wiper arm 12. A further recess 53 in the wiper arm 12 serves to receive an elevation or further projection 54 of the rider 18.

If the adaptor 16 is inserted into the end region 40 of the wiper arm 12, the side walls of the rocker 34 are in abutment with the inner sides of the end region 40. As a result, the adaptor 16 is also fixed to the wiper arm 12 in a direction transversely with respect to the direction of extent of the wiper arm 12, in other words transversely with respect to the direction of longitudinal extent of the wiper blade 14. Furthermore, the sliding latch 22 also ensures that the adaptor 16 cannot move out of the receiving region 40 of the wiper arm 12 upwards, in other words perpendicularly with respect to the wiping surface definable by the wiping movement of the wiper blade 14.

For this purpose, two rails 56 (FIGS. 2 and 8) are arranged on respective side walls 58 of the sliding latch 22 likewise having a U-profile in cross section, wherein these rails 56 project inwardly from an inner side of the respective side wall 58. These rails 56 engage around the wiper arm 12 in the end region 40 on the lower side and therefore serve as a guide for the translational displacement of the sliding latch 22 relative to the wiper arm 12. The bar studs 48 received in the recesses 46 of the wiper arm 12 also rest on the rails 56 of the sliding latch 22 if the latter is displaced into its functional position shown in FIGS. 2 and 7, in other words in this case backwards. This prevents downward displacement of the wiper arm 12 relative to the latch 22 to secure the wiper arm 12 to the rocker 34.

Referring to FIG. 2, a latching nose 59 projects inwardly from the side wall 58 to make it possible, when the sliding latch 22 is displaced into the installation position, to bring the bar studs 48 of the rocker 34 into the recesses 46 provided in the side walls 44 of the wiper arm 12 which is performed by inserting the adaptor 16 from below into the end region 40 of the wiper arm 12. The latching noses 59 projecting inwardly from the side walls 58 of the sliding latch 22 can be inserted into latching notches 60 (FIGS. 2 and 4) that are made in the wiper arm 12 in the end region 40 thereof. Then the latch 22 is slid along the wiper arm 12 to secure the wiper arm and adaptor 16 together.

As further seen in FIG. 2, a region 61 between the two rails 56 and a region 62 between the rear rail 56 and a latching nose 59 likewise projecting inwardly from the side wall 58 make it possible, when the sliding latch 22 is displaced into the installation position, to bring the bar studs 48 of the rocker 34 into the recesses 46 provided in the side walls 44 of the wiper arm 12 by inserting the adaptor 16 from below into the end region 40 of the wiper arm 12.

The latching noses 59 projecting inwardly from the side walls 58 of the sliding latch 22 can be inserted into front latching notches 60 or into rear latching notches 63 (FIGS. 2 and 4) that are made in the wiper arm 12 in the end region 40 thereof. If the respective latching nose 59 is in the front latching notch 60, then the sliding latch 22 protrudes forward over the end region 40 of the wiper arm 12 and a front wall 64 of the sliding latch 22 is spaced apart from a spacer 65 defining an end 66 of the wiper arm 12.

Figure 5:
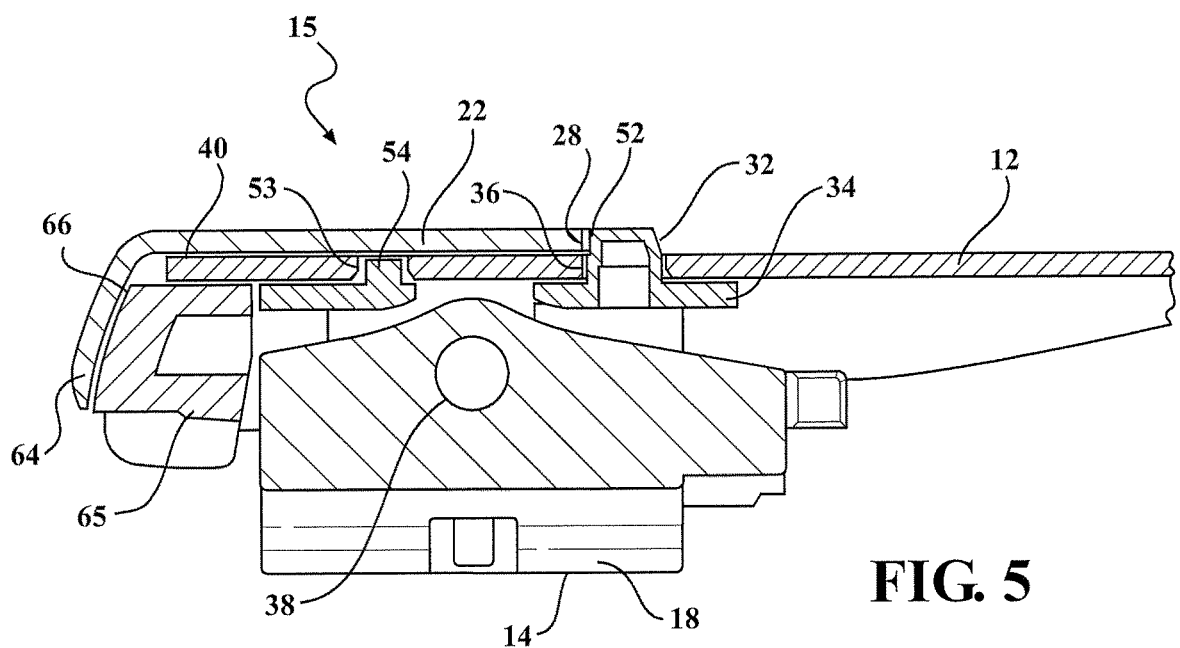
FIG. 5 is a cutaway view of the wiper arm connected to the related art adaptor and to a wiper blade as shown in FIG. 3.

If, on the other hand, the sliding latch 22 is displaced backwards, the latching nose 59 is then in the rear latching notch 63, so the front wall 64 of the sliding latch 22 is in abutment with the spacer 65 defining the front end 66 of the wiper arm 12, for example, as shown in FIGS. 2 and 5. An installer working on the sliding latch 22 can clearly hear and feel, whether the latching nose 59 is latched in the front latching notch 60 or in the rear latching notch 63.

Referring to FIGS. 1-5, the spacer 65 is formed as a separate block that fits onto the end of the rocker 34. The spacer 65 includes an upward opening slot 67 and rib 68 (FIG. 10) that engages with a corresponding formation, such as slot 12A and flange 12B, on the wiper arm 12 to secure the two components vertically together and hold the spacer 65 longitudinally against the rocker 34.

In this manner, the connecting system 15 includes the rider 18 and rocker 34 to form the adaptor unit 16 that joins to the wiper arm 12. However, this arrangement specifically requires that the rocker 34 be formed with the specific construction show herein including the posts 48.

Referring to FIGS. 9-12, a first embodiment of the invention includes an improved adaptor 70 that generally includes a slider 71 and a rocker or intermediate connector 72 that attaches both to the slider 71 and to the wiper arm 12. The adaptor 70 is configured to mate with and join to the wiper arm 12, the spacer 65, and the latch 22 without modification to such components. However, the adaptor 70 is configured to join to the preexisting wiper arm 12 using the latch 22 and the spacer 65 while still mating to a distinctly different wiper blade 14 that uses a different slider 71 that is configured for a non-original wiper blade 14.

The slider 71 may be any of a variety of wiper blade components that might be joined to the connector 72. In one embodiment, the slider 71 may include appropriate connector formations in a main body 73 such as bores, holes or the like formed similar to the passage opening 38 described above. The connector formations may be formed in the side faces of the main body 73, for example, as seen by the opening 38 in FIG. 4.

Figure 9:
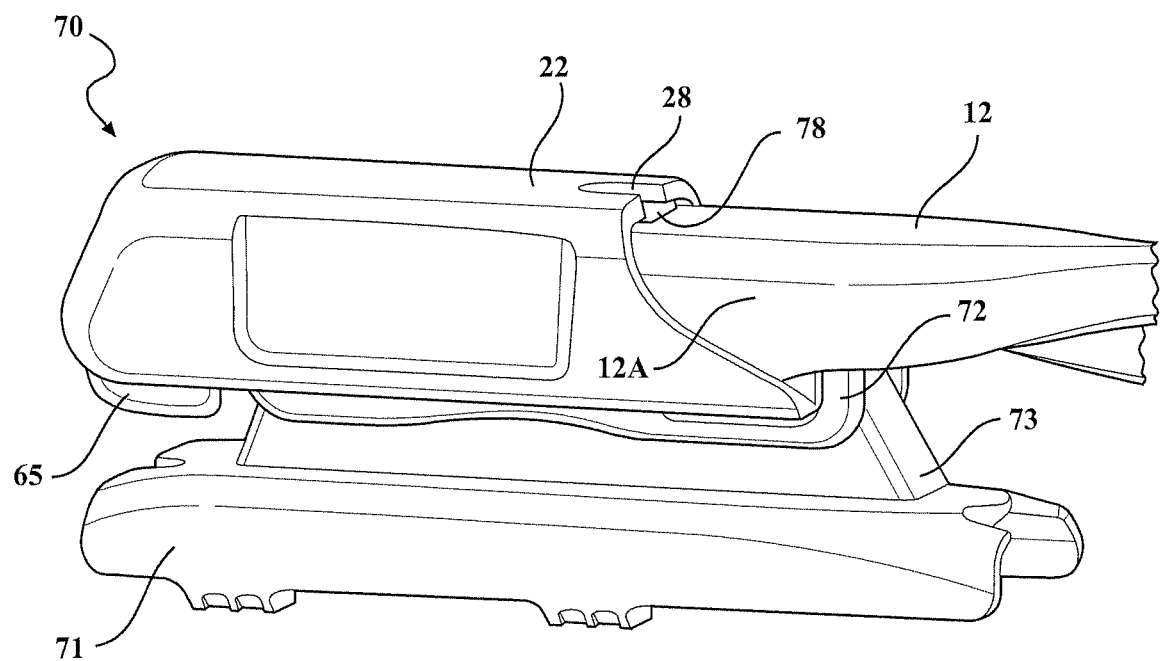
FIG. 9 is a perspective view of the wiper arm assembled with an adaptor according to one embodiment of the invention.
Figure 10:
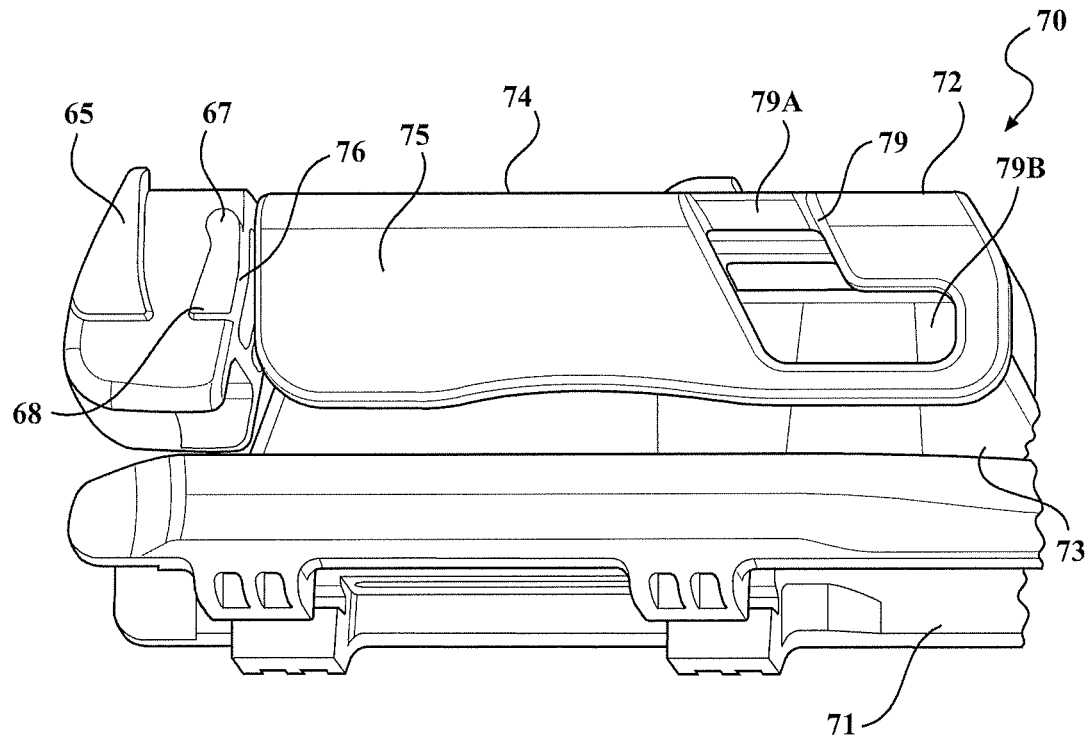
FIG. 10 is a side perspective view of the adaptor according to the embodiment shown in FIG. 9.
Figure 11:
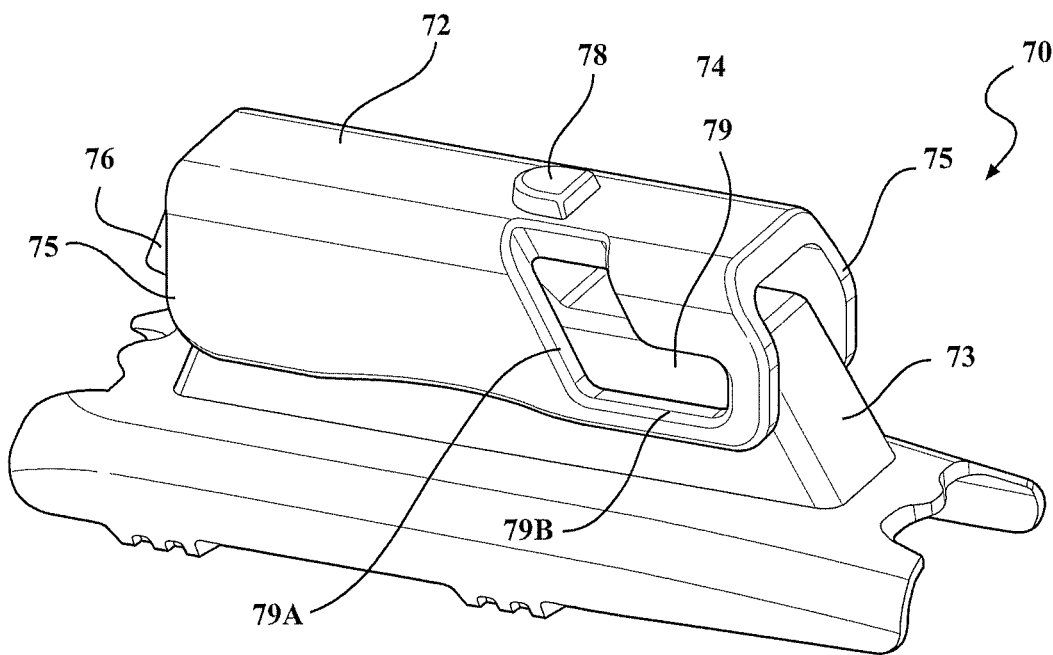
FIG. 11 is a side perspective view of the adaptor according to the embodiment shown in FIG. 9.
Figure 12:
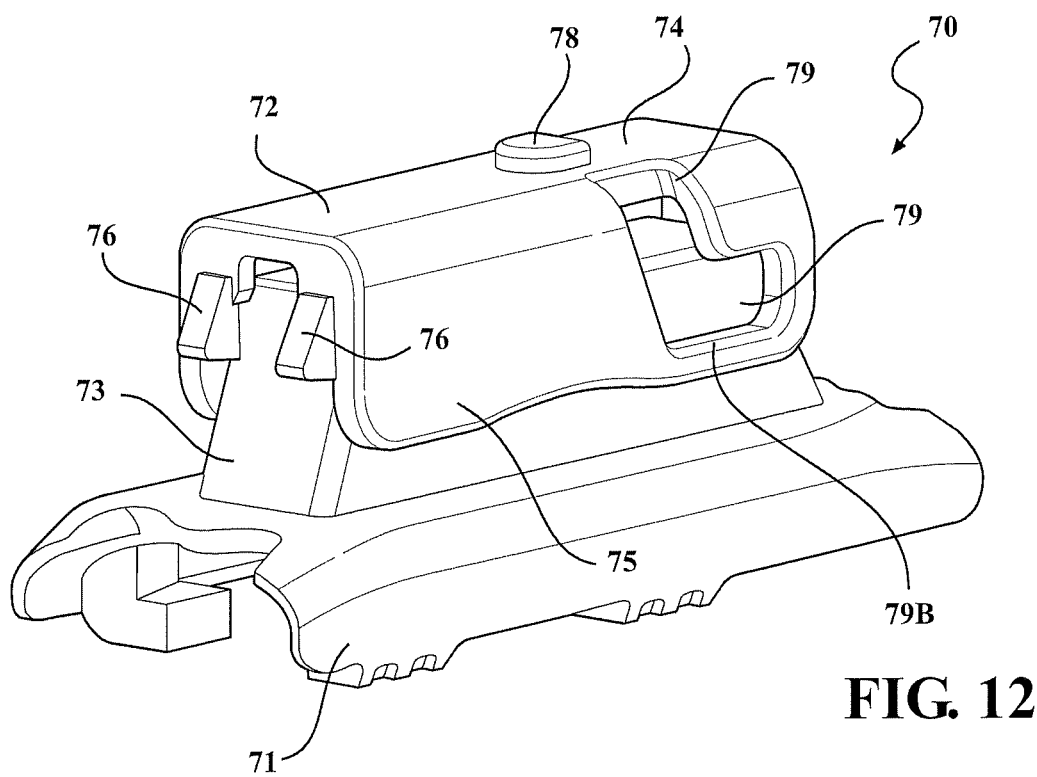
FIG. 12 is a front perspective view of the adaptor according to the embodiment shown in FIG. 9.
Figure 13:
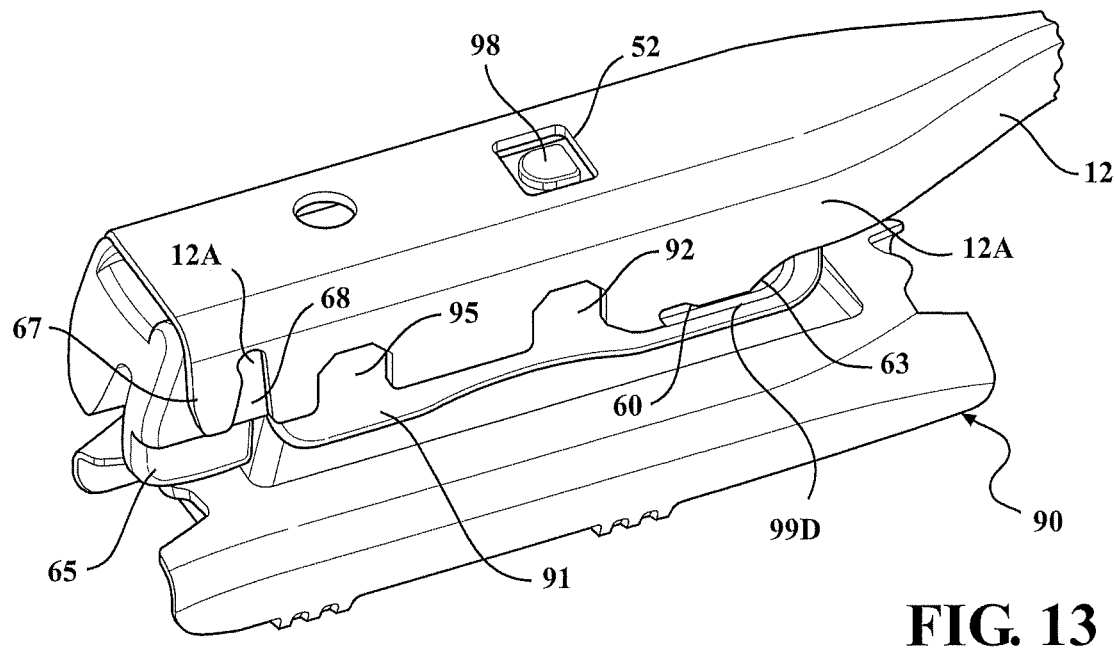
FIG. 13 is a top perspective view of an adaptor according to a second embodiment and wherein the adaptor is assembled with the wiper arm and the sliding latch omitted for clarity.

In this improved adaptor 70 of FIGS. 10-12, the rocker 72 is formed as a U-shaped channel having a main wall 74 and side walls 75. The rocker 72 may also include ribs 76 that project outwardly to engage and inner end of the spacer 65 as generally seen in FIG. 10. These ribs 76 align the spacer 65 to permit sliding of the latch 22. The rocker 72 also includes a pin-shaped projection or bolt 78 (FIGS. 11 and 12) that is configured to fit into the recess 28 provided in the sliding latch 22 as seen in FIG. 9. Therefore, the latch 22 can still slide longitudinally between the two operative positions described above relative to FIGS. 1-9.

Figure 19:
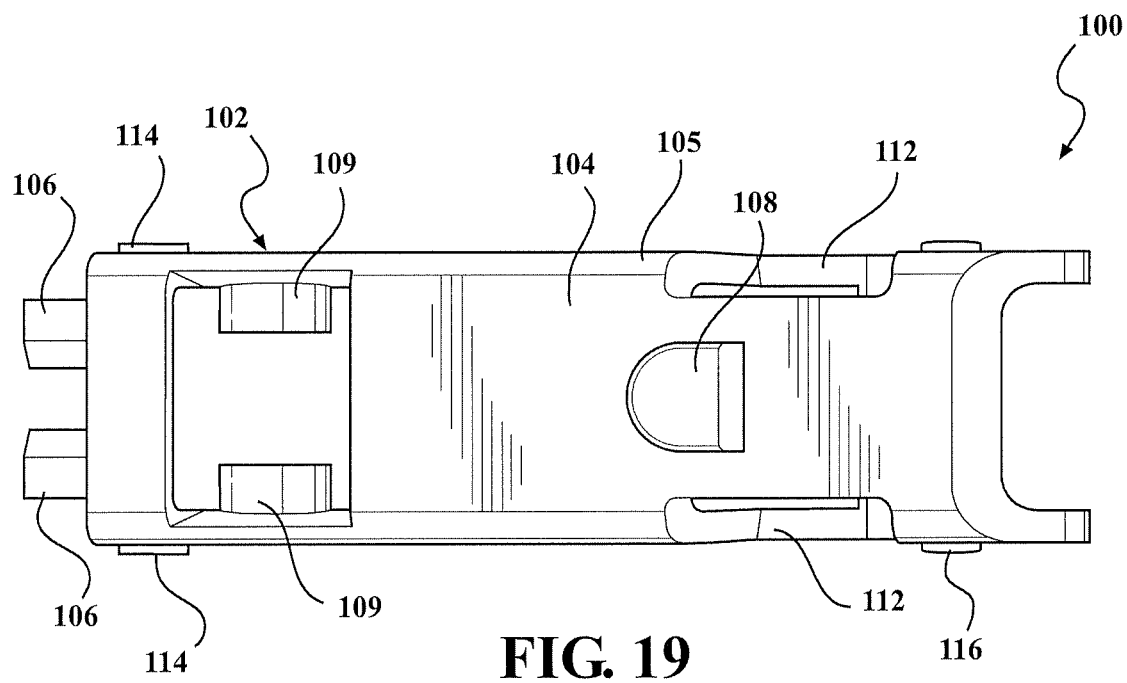
FIG. 19 is a top view of the adaptor shown in FIG. 17.
Figure 20:
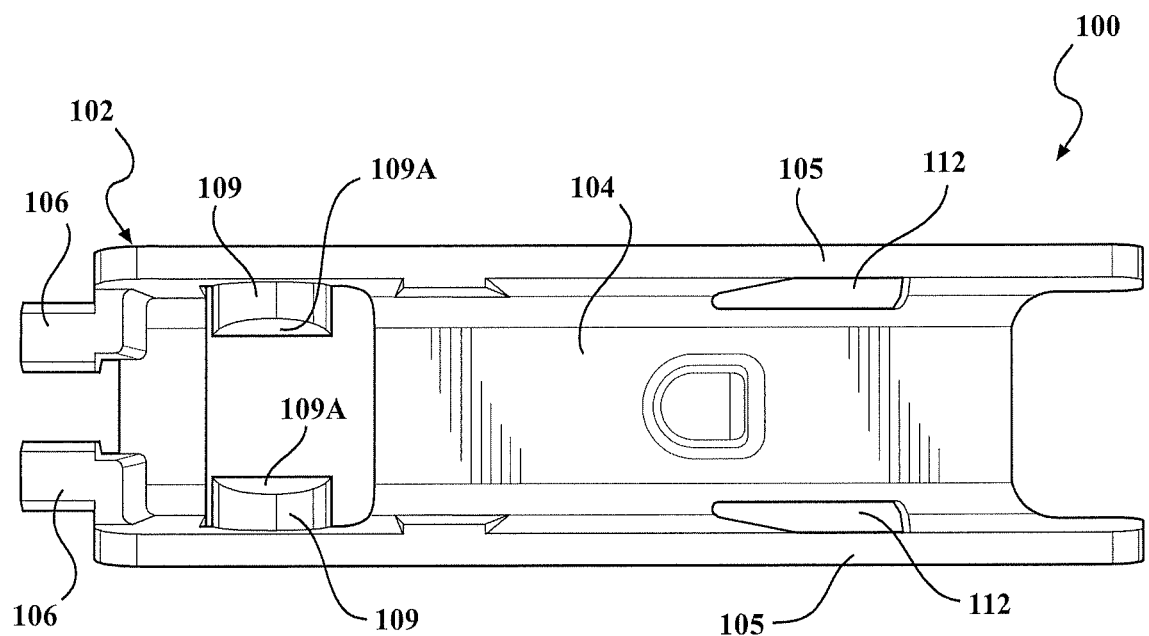
FIG. 20 is a bottom view of the adaptor shown in FIG. 17.
Figure 21:
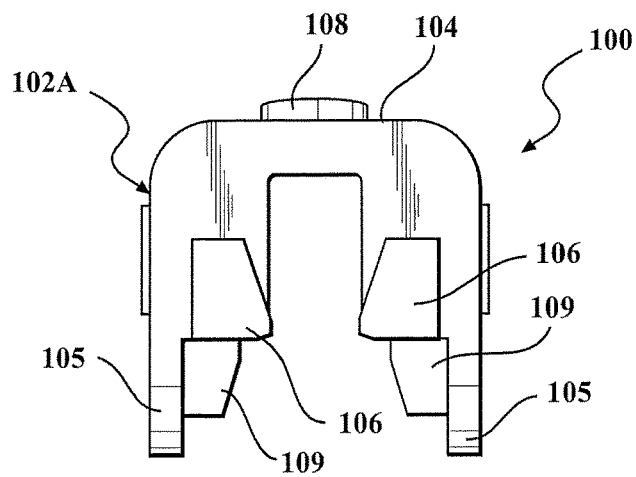
FIG. 21 is an end view of the adaptor shown in FIG. 17.
Figure 22:
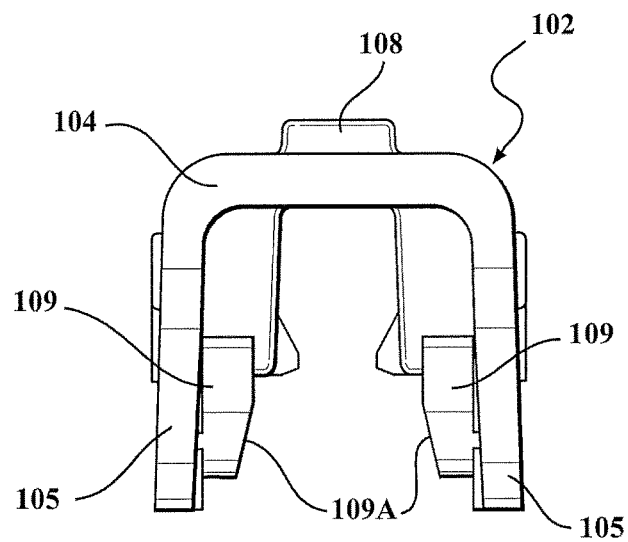
FIG. 22 is an opposing end view of the adaptor shown in FIG. 17.
Figure 23:
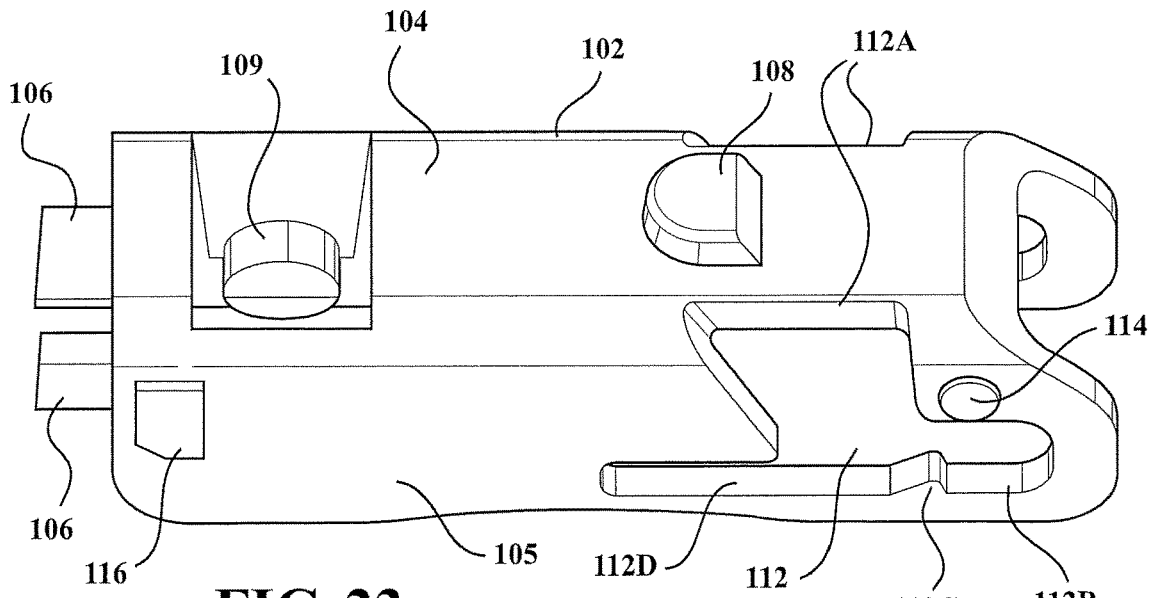
FIG. 23 is a perspective view of the adaptor shown in FIG. 17.

Notably, the slider 71 preferably does not include the pins 48 or the bearing bolt 36 described above. Rather the slider 71 may include connector formations such as bores like the opposite ends of passage opening 38 that receive complementary connector formations such as pins, like pins 109 (FIGS. 19 and 20) that are provided in the rocker 72 to pivotally connect the rocker 72 to the slider 71. The following disclosure illustrates such an arrangement in greater detail.

Further as seen in FIGS. 10-12, the side walls 75 also include generally L-shaped connector slots or other formations 79 that are configured to mate with the latching noses 59 described previously relative to FIG. 2. The latching noses 59 extend inwardly to a greater extent than the rails 56 such that the latching noses 59 can extend through and inwardly past the wiper arm side walls 12A (FIG. 9) and into the slots 79. The latching noses 59 can be seen as including an inward leg 59A and a vertical leg 59B in FIG. 2 wherein the length of the inward leg 59A positions the vertical leg 59B within the slot 79 while the vertical leg 59B fills the vertical space of the slot 79 to prevent the wiper arm 12 from displacing vertically relative to the rocker 72.

In more detail, the slot 79 includes a first leg 79A that preferably extends vertically to allow the latching noses 59 to slide downwardly as the adaptor 70 is fitted to the wiper arm 12. Preferably the first leg 79A is also slanged at an angle relative to a longitudinal second leg 79B. The slot 79 also includes the longitudinal second leg 79B that extends away from the first leg 79A. The latch 22 can be slid longitudinally so that the vertical leg 59B of the latch 22 slides longitudinally into the inward leg 79B as the latch 22 is slid to the locked position to prevent vertical displacement of the wiper arm 12 relative to the adaptor 70. The latch 22 is in turn restrained vertically on the wiper arm 12 by the above-described rails 56 (FIGS. 2 and 8). Due to the slanted angle of the first leg 79A, the latch 22 and wiper arm 12 may displace both vertically and longitudinally to engage the ribs 76 with the spacer 65. In this manner the latch 22 joins and engages the wiper arm 12 with the adaptor 70.

Figure 14:
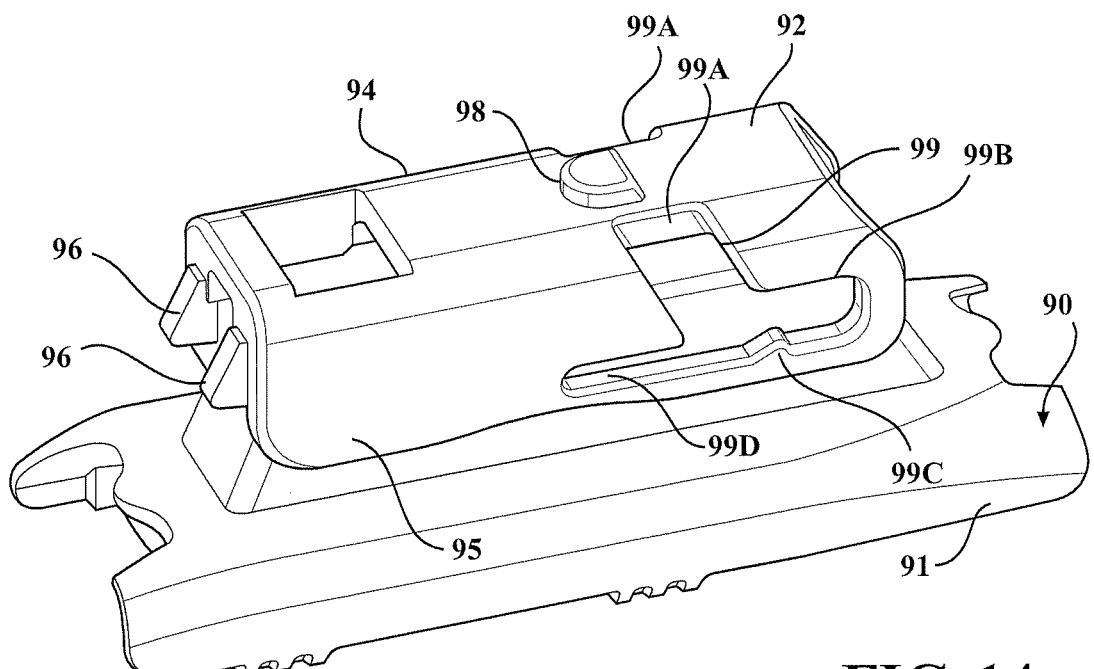
FIG. 14 is a side perspective view of the adaptor according to the second embodiment.
Figure 15:
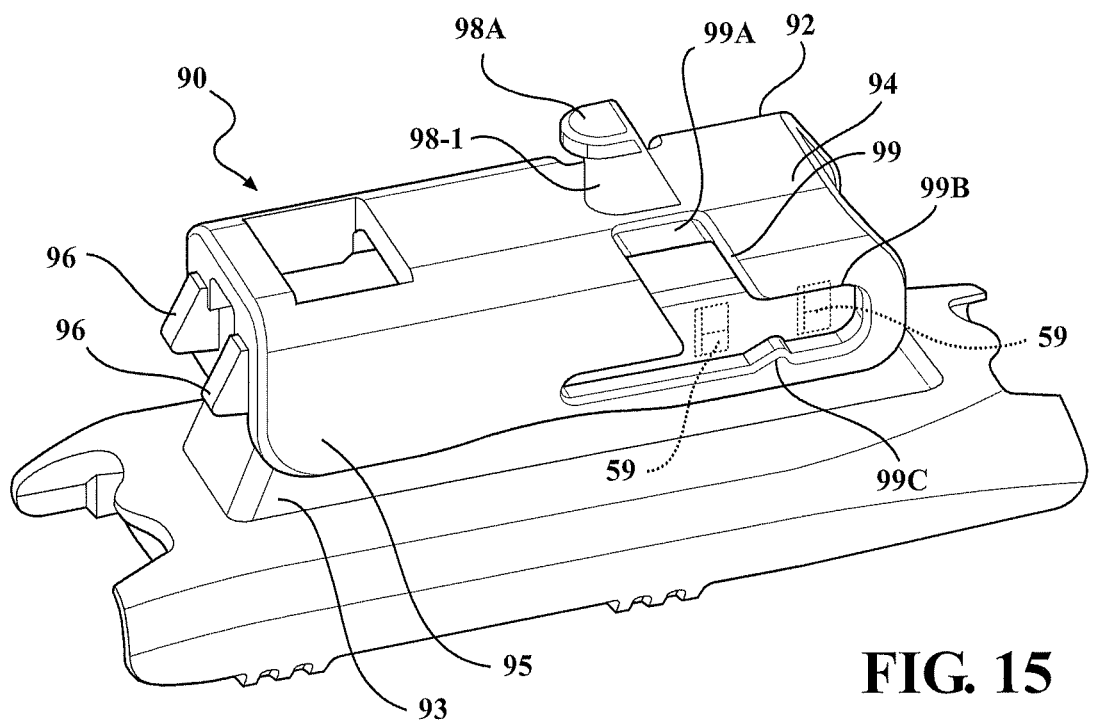
FIG. 15 is a side perspective view of an alternate configuration of the adaptor according to the second embodiment.
Figure 16:
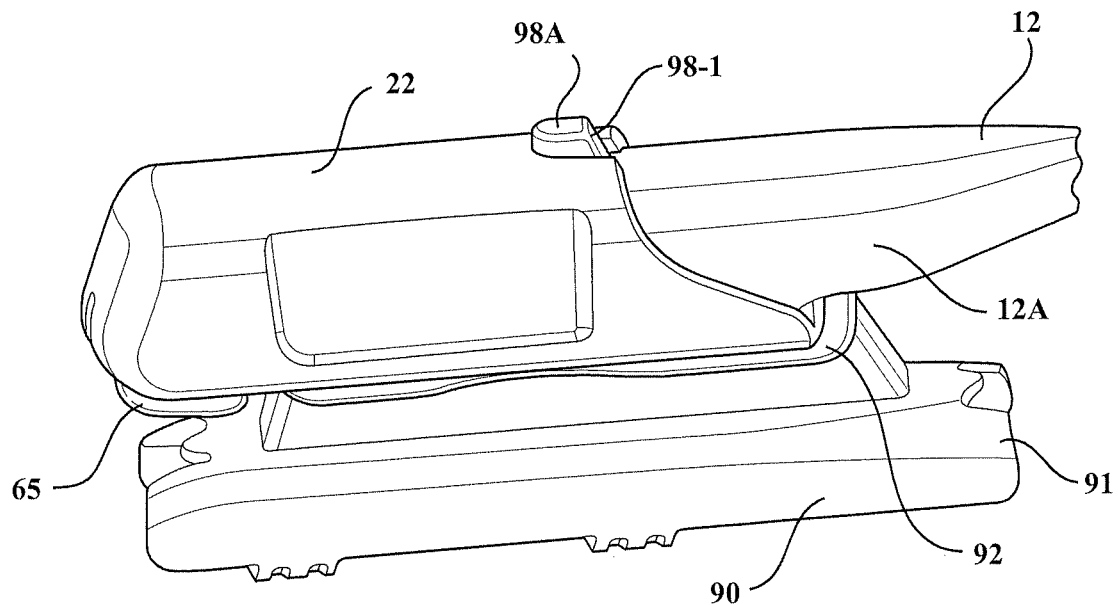
FIG. 16 is a side perspective view of the adaptor shown in FIG. 15 and wherein the adaptor is assembled with the wiper arm and the sliding latch removed for clarity.

Referring to FIGS. 13-16, a second configuration of the inventive adaptor is identified by reference numeral 90. The second embodiment of the invention includes an improved adaptor 90 that generally includes a slider 91 and a rocker or intermediate connector 92 that attaches both to the slider 91 and to the wiper arm 12. The adaptor 90 is configured to mate with and join to the wiper arm 12, the spacer 65, and the latch 22 without modification to such components as seen in FIG. 16. However, the adaptor 90 is configured to join the preexisting wiper arm 12 using the latch 22 and the spacer 65 while still mating to a distinctly different wiper blade 14 that uses a different slider 91 that is configured for a non-original wiper blade 14.

The slider 91 may be any of a variety of wiper blade components that might be joined to the connector 92. In one embodiment, the slider 91 may include appropriate connector formations in a main body 93 such as bores, holes or the like. The connector formations may be formed in the side faces of the main body 93.

In this improved adaptor 90, the rocker 92 is formed as a U-shaped channel having a main wall 94 and side walls 95. The adaptor 90 may also include ribs 96 that project outwardly to engage the inner end of the spacer 65 as generally seen in FIG. 10 and also FIG. 13. These ribs 96 align the spacer 65 to permit sliding of the latch 22. The rocker 92 also includes a pin-shaped projection or bolt 98 on the toper surface thereof that is configured to fit into the through-opening 52 of the wiper arm 12 (FIG. 13) but not necessarily into the recess 28 provided in the sliding latch 22 as seen in FIG. 9. Therefore, the latch 22 can still slide longitudinally between the two operative positions described above. In FIGS. 15 and 16, the bolt 98 may be formed as modified bolt 98-1 that does project into the latch recess 22 and includes a rib 98A. The rib 98A projects longitudinally and fits over the top of the wiper arm 12 to restrain the wiper arm 12 vertically as seen in FIGS. 15 and 16.

Notably, the slider 91 preferably does not include the pins 48 or the bearing bolt 36 described above. Rather the slider 91 may include connector formations such as bores like the opposite ends of passage opening 38 that receive complementary connector formations such as pins, like pins 109 (FIGS. 19 and 20), that are provided in the rocker 92 to pivotally connect the rocker 92 to the slider 91. The following disclosure illustrates such an arrangement in detail.

Further as seen in FIGS. 14 and 15, the side walls 95 also include generally L-shaped connector slots or other formations 99 that are configured to mate with the above-described latching noses 59. The latching noses 59 extend inwardly to a greater extent than the rails 56 such that the latching noses 59 can extend through inwardly past the wiper arm side walls and into the slots 99. The latching noses 59 can be seen as including an inward leg 59A and a vertical leg 59B in FIG. 2 wherein the length of the inward leg 59A positions the vertical leg 59B within the slot 99 while the vertical leg 59B fills the vertical space of the slot 99 to prevent the wiper arm 12 from displacing vertically relative to the rocker 92.

In more detail, the slot 99 includes a first leg 99A that preferably extends vertically to allow the latching noses 59 to slide downwardly as the adaptor 16 is fitted to the wiper arm 12. Preferably, the first leg 99A is also slanted at an angle relative to a longitudinal second leg 99B. The slot 99 also includes the longitudinal second leg 99B that extends away from the first leg 99A. The latch 22 can be slid longitudinally so that the vertical leg 59B of the latch 22 slides longitudinally into the inward leg 99B as the latch 22 is slid to the locked position to prevent vertical displacement of the wiper arm 12 relative to the adaptor 90. The latch 22 is in turn restrained vertically on the wiper arm 12 by the above-described rails 56 (FIGS. 2 and 8). Due to the slanted angle of the first leg 99A, the latch 22 and wiper arm 12 may displace both vertically and longitudinally to engage the ribs 96 with the spacer 65. In this manner the latch 22 joins and engages the wiper arm 12 with the adaptor 90.

Further, the second leg 99B also includes a detent 99C that can positively restrain the latching noses 59 in one of the two positions described above. Further, the slot 99 includes a secondary slot 99D that allows for cooperation with additional structures to provide additional functionality and/or may allow the slot 99 to flex as the latching noses 59 are slid into the second leg 99B.

Referring to FIGS. 17-23, a preferred form of the second configuration of the adaptor is identified by reference numeral 100. The preferred configuration of the second embodiment of the invention includes an improved adaptor 100 that generally includes the slider 91 described above and an improved rocker or intermediate connector 102 that attaches both to the slider 91 and the wiper arm 12. The adaptor 100 is configured to mate with and join to the wiper arm 12, the spacer 65, and the latch 22 without modification to such components as described above. However, the adaptor 100 is configured to join the preexisting wiper arm 12 using the latch 22 and the spacer 65 while still mating to a distinctly different wiper blade 14 that uses the different slider 91 that is configured for a non-original wiper blade 14.

In accord with the foregoing, the slider 91 may be any of a variety of wiper blade components that might be joined to the connector 92. In one embodiment, the slider 91 may include appropriate connector formations in the main body 93 such as bores, holes or the like formed similar to the passage opening 38 described above. The connector formations may be formed in the side faces of the main body 93, for example, as seen by the opposite ends of the opening 38 in FIG. 4.

In this improved adaptor 100, the rocker 102 is formed as a U-shaped channel having a main wall 104 and side walls 105. The adaptor 100 may also include ribs 106 that project outwardly and are angled to engage an inner end of the spacer 65 as generally seen in FIG. 10. These ribs 106 align the spacer 65 to permit sliding of the latch 22. The rocker 102 also includes a pin-shaped projection or bolt 108 that may be flat on one side and arcuate on the other and is configured to fit into the recess 28 provided in the sliding latch 22 as seen in FIG. 9. Therefore, the latch 22 can still slide longitudinally between the two operative positions described above.

Notably, the slider 91 preferably does not include the pins 48 or rely upon the bearing bolt 36 described above. Rather the slider 91 may include connector formations such as bores like the passage openings 38 that receive complementary connector formations such as pins 109 that are provided in the rocker 102. The following disclosure illustrates such an arrangement in greater detail. The pins 109 project inwardly into the interior space of the rocker 102 and include a ramped cam surface 109A that facilitate downward sliding and snapping into complementary formations in the slider 91, such as the ends of the passage opening 38, to permit relative pivoting or rocking of the rocker 102 relative to the slider 91.

Figure 17:
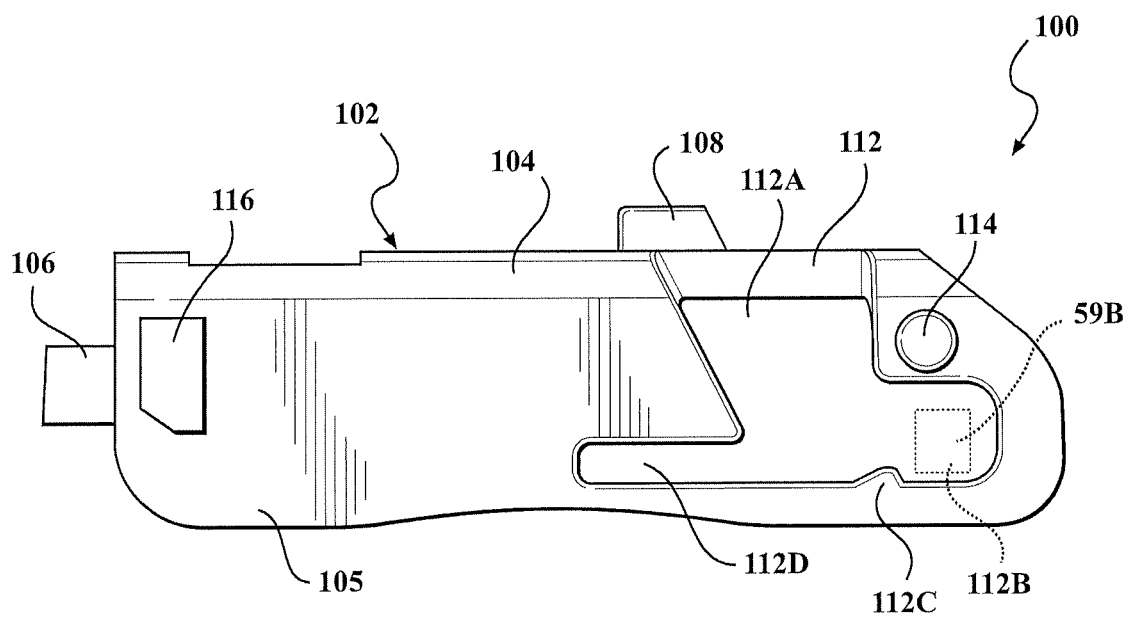
FIG. 17 is a side view of a preferred configuration of the adaptor according to the second embodiment.
Figure 18:
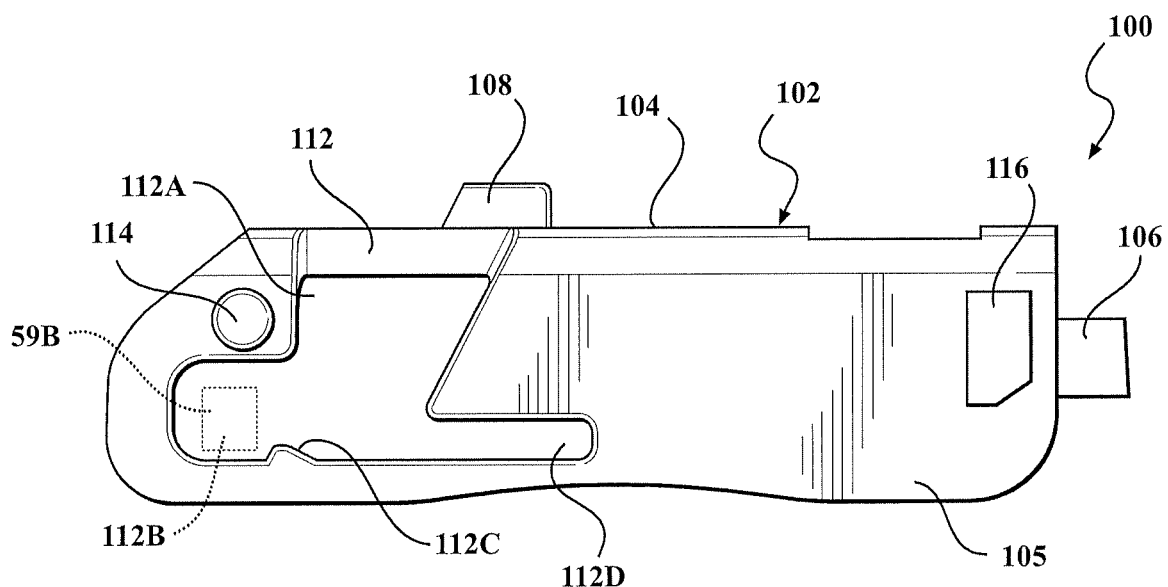
FIG. 18 is an opposing side view of the adaptor shown in FIG. 17.

Further, the side walls 105 also include generally L-shaped connector slots or other formations 112 that are configured to mate with the latching noses 59 of the latch 22. The latching noses 59 extend inwardly to a greater extent than the rails 56 such that the latching noses 59 can extend through inwardly past the wiper arm side walls 12A and into the slots 112. The latching noses 59 can be seen as including an inward leg 59A and a vertical leg 59B in FIG. 2 wherein the length of the inward leg 59A positions the vertical leg 59B within the slot 112 while the vertical leg 59B fills the vertical space of the slot 112 to prevent the wiper arm 12 from displacing vertically relative to the rocker 102 as generally shown in FIG. 17.

In more detail, the slot 112 includes a first leg 112A that preferably extends vertically to allow the latching noses 59 to slide downwardly as the adaptor 100 is fitted to the wiper arm 12. Preferably, the first leg 112A is slanged at an angle relative to a longitudinal second leg 112B. The slot 112 also includes the longitudinal second leg 112B that extends away from the first leg 112A. The latch 22 can be slid longitudinally so that the vertical leg 59B of the latch 22 slides longitudinally into the inward leg 112B as the latch 22 is slid to the locked position to prevent vertical displacement of the wiper arm 12 relative to the adaptor 100. The latch 22 is in turn restrained vertically on the wiper arm 12 by the above-described rails 56 (FIGS. 2 and 8). Due to the slanted angle of the first leg 112A, the latch 22 and wiper arm 12 may displace both vertically and longitudinally to engage the ribs 106 with the spacer 65. In this manner the latch 22 joins and engages the wiper arm 12 with the adaptor 100.

Further, the second leg 112B also includes a detent 112C that can positively restrain the latching noses 59 in one of the two positions described above wherein the latch 22 can be moved between the locked position wherein the vertical latch leg 59B is confined in the second slot leg 112B and the installation position wherein the latch leg 59B is disposed in and vertically slidable in the first slot leg 112A. Further, the slot 112 includes a secondary slot 112D that allows for cooperation with additional structures to provide additional functionality such as flexing of the slot area 59.

Still further, the side walls 105 may also include generally cylindrical projections 114 and block-like projections 116 at the opposite end which may serve as wear pads.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An adaptor to connect a wiper blade to an end region of a wiper arm of a vehicle, said end region of said wiper arm having a U-profile in cross section, said wiper arm configured with a sliding latch having a recess, a U-profile in cross section having opposing first and second latch side walls, and a latching projection on a lower side of said sliding latch, said adaptor comprising:
   an intermediate connector comprising a U-shaped channel having a main wall, opposing first and second connector side walls, a first slot in said first connector side wall configured to engage with said latching projection on said sliding latch, and a first projection extending upward from said main wall and configured to engage with said recess in said sliding latch, a second slot in said second connector side wall configured to mate with said second latching nose, wherein each of said first and second slots further comprises a first leg generally extending vertically, a longitudinal second leg extending away from said first leg, and a detent to positively restrain said respective latching nose within said second leg; and
   a slider comprising a first connector formation configured to engage with said intermediate connector and at least one second connector formation configured to retain said wiper blade.

2. The adaptor as set forth in claim 1, wherein said intermediate connector comprises a first rib projecting outwardly from one of said connector side walls, said first rib being configured to engage a spacer assembled at an end of said wiper arm.

3. The adaptor as set forth in claim 2, wherein said intermediate connector comprises a pin configured to engage with said first connector formation of said slider.

4. The adaptor as set forth in claim 3, wherein said projection on said lower side of said sliding latch comprises a first latching nose projecting inward from a first latch side wall; and
   wherein said first slot in said first connector side wall of said intermediate connector extends upward on said first connector side wall and through said main wall providing a passageway for said first latching nose.

5. The adaptor as set forth in claim 4, wherein said sliding latch comprises a second latching nose projecting inward from said second latch side wall; and
   wherein a second slot in said second connector side wall is configured to mate with said second latching nose.

6. The adaptor as set forth in claim 3, wherein said pin projects inwardly onto an interior space of said intermediate connector.

7. The adaptor as set forth in claim 6, wherein said intermediate connector further comprises a cylindrical projection extending from each of said connector side walls.

8. The adaptor as set forth in claim 7, wherein said intermediate connector further comprises a block-like projection extending from each of said connector side walls.

9. The adaptor as set forth in claim 1, wherein one of said first and second slots further comprises a secondary slot extending longitudinally from said respective slot.

10. The adaptor as set forth in claim 9, wherein said first projection of said intermediate connector comprises a bolt having a rib extending laterally from said bolt.

11. An adaptor to connect a non-original wiper blade to an end region of a wiper arm of a vehicle, said wiper arm having a sliding latch, said adaptor comprising:
a rocker comprising a U-shaped channel having a main wall, opposing first and second rocker side walls, a first L-shaped slot in said first rocker side wall configured to engage with a first latching nose on said sliding latch, and a first boss extending upward from said main wall and configured to engage with a recess in said sliding latch, wherein said first L-shaped slot further comprises a first leg generally extending vertically, a longitudinal second leg extending away from said first leg, and a detent to positively restrain said respective latching nose within said second leg; and
a slider configured to engage with said rocker and configured to retain said wiper blade.

12. The adaptor as set forth in claim 11, wherein said rocker comprises a first rib projecting outwardly from said first rocker side wall, said first rib being configured to engage a spacer assembled at an end of said wiper arm.

13. The adaptor as set forth in claim 12, wherein said slider comprises a first slider side wall having a bore; and
wherein said rocker comprises a pin projecting inwardly from said first rocker side wall onto an interior space of said rocker, said pin configured to engage with said bore in said first slider side wall.

14. The adaptor as set forth in claim 13, wherein said sliding latch comprises a U-profile in cross section having opposing first and second latch side walls, said first latching nose projecting inward from said first latching side wall, and a second latching nose projecting inward from said second latch side wall; and
wherein a second L-shaped slot in said rocker second side wall is configured to mate with said second latching nose.

15. The adaptor as set forth in claim 14, wherein each of said first and second L-shaped slots further comprise a first leg generally extending vertically and a longitudinal second leg extending away from said first leg.

16. The adaptor as set forth in claim 15, wherein each of said longitudinal second legs further comprise a detent to positively restrain said respective latching nose within said second leg.

17. The adaptor as set forth in claim 16, wherein at least one of said first and second L-shaped slots further comprise a secondary slot extending longitudinally from said respective L-shaped slot.

18. A method for connecting a non-original wiper blade to a wiper arm for a windshield wiper system of a vehicle, the wiper arm having a sliding latch and a spacer, said spacer having a slot, said sliding latch having a U-profile in cross section, a recess on a main wall, and a latching nose projecting inward from each latch side wall, in which said non-original wiper blade is fitted onto said wiper arm, the method comprising:
providing an adaptor comprising a rocker and a slider;
said rocker having: a U-shaped channel with a rocker main wall, opposing first and second rocker side walls, an L-shaped slot in each rocker side wall, a rib extending longitudinally from one of the rocker side walls, a boss extending from said rocker main wall, and a pin extending inward from each of said rocker side walls;
said slider having: a first connector formation on each slider side wall configured to engage with each of said pins, and a second connector formation configured to retain said non-original wiper blade;
providing said non-original wiper blade;
assembling said non-original wiper blade with said slider such that said second connector formation retains said non-original wiper blade;
assembling said slider with said rocker such that said pins extending from each of said rocker side walls are engaged with said first connector formations on said slider;
inserting said rocker rib into said slot in said spacer;
inserting said latching nose into said respective L-shaped slot; and
inserting said boss into said recess of said sliding latch.

* * * * *